(12) United States Patent
Hähnel et al.

(10) Patent No.: US 6,641,016 B2
(45) Date of Patent: Nov. 4, 2003

(54) DEVICE FOR FRACTURE-SPLITTING A WORKPIECE

(75) Inventors: Michael Hähnel, Essingen (DE); Horst Wisniewski, Reutlingen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 0 days.

(21) Appl. No.: 09/965,318

(22) Filed: Sep. 27, 2001

(65) Prior Publication Data

US 2002/0070257 A1 Jun. 13, 2002

Related U.S. Application Data

(63) Continuation of application No. PCT/EP00/03579, filed on Apr. 19, 2000.

(30) Foreign Application Priority Data

Apr. 21, 1999 (DE) .......................................... 199 18 067

(51) Int. Cl.⁷ .................................................. B26F 3/00
(52) U.S. Cl. ...................... 225/103; 225/96.5; 225/97; 29/888.09
(58) Field of Search ....................... 225/96, 96.5, 100, 225/101, 103, 104, 105, 97, 93, 2; 29/888.09, 413, 416

(56) References Cited

U.S. PATENT DOCUMENTS

| 4,569,109 | A |   | 2/1986  | Fetouh |
|-----------|---|---|---------|--------|
| 4,684,267 | A | * | 8/1987  | Fetouh ........................ 384/294 |
| 5,131,577 | A | * | 7/1992  | Hoag et al. ................. 225/96.5 |
| 5,169,046 | A | * | 12/1992 | Miessen et al. ............. 225/100 |
| 5,320,265 | A | * | 6/1994  | Becker ........................ 225/104 |
| 5,503,317 | A | * | 4/1996  | Jones et al. .................. 225/103 |
| 5,699,947 | A | * | 12/1997 | Cavallo et al. ............. 225/101 |
| 5,911,349 | A | * | 6/1999  | Wiesemann et al. ........ 225/103 |
| 6,145,574 | A | * | 11/2000 | Luchner et al. .......... 29/888.09 |

FOREIGN PATENT DOCUMENTS

| DE | 19704131 A1 |   | 8/1998 |
| WO | WO 98/33616 | * | 8/1998 |

* cited by examiner

*Primary Examiner*—Stephen Choi
(74) *Attorney, Agent, or Firm*—Wolf, Greenfield & Sacks, P.C.

(57) ABSTRACT

The invention relates to a device for fracture-separating a workpiece comprising several ring-shaped workpiece sections which are aligned axially one behind the other. The device comprises at least one expansion device which can be introduced axially into a borehole, formed in each ring-shaped workpiece section and has at least one expansion element that can be expanded in at least two axial expansion areas which lie at a distance from each other in the axial direction. The expansion device is provided with an integrated expansion control device which interacts with the expansion element for controlling a variable position and/or a variable expansion distance and/or a variable expansion period and/or a variable expansion sequence of at least the two expansion areas.

7 Claims, 3 Drawing Sheets

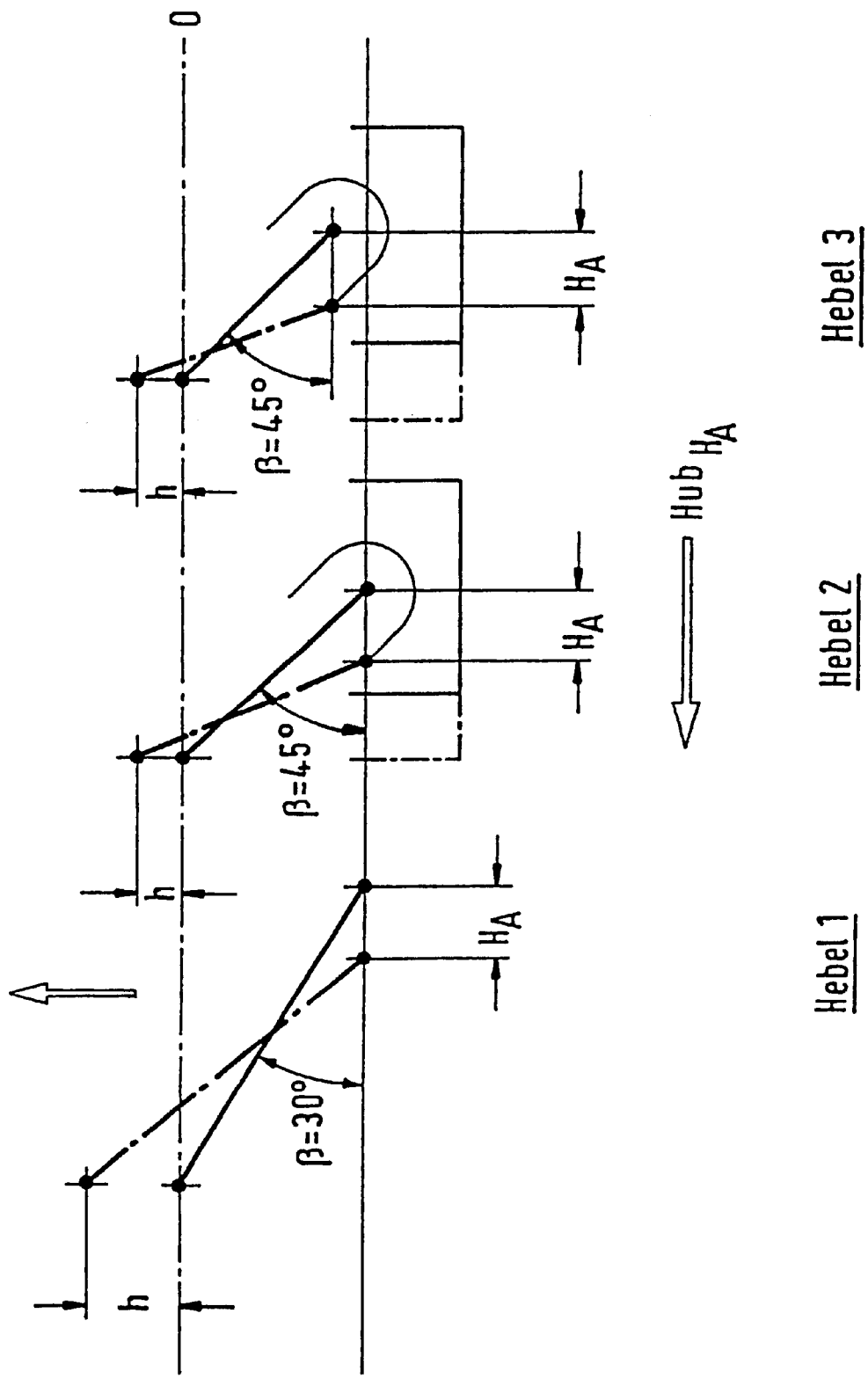

DEVICE FOR FRACTURE-SPLITTING A WORKPIECE

TECHNICAL FIELD

The invention relates to a device for fracture-splitting a workpiece as it reads from the preamble of claim 1.

PRIOR ART

Known from U.S. Pat. No. 4,684,267 and EP 0 167 320 B1 respectively is a device for fracture-splitting a workpiece comprising several ring-shaped workpiece sections axially aligned in sequence, the device being provided with at least one expander means axially insertable into a bore formed by each of the ring-shaped workpiece sections and expandable at at least two expansion portions spaced away from each other axially. The expander means comprises an expanding mandrel featuring a plurality of expanding segments radially movable relative to the bore, whereby each expanding segment forms an expansion portion of the expanding mandrel. All expanding segments are to be actuated in common via an elongated actuating element extending in the interior of the expanding mandrel and coupled to a positioner located outside of the expanding mandrel. The actuating element comprises a plurality of wedge elements including first bevels extending at an angle to the axial direction assigned complementary to a plurality of second bevels likewise extending at an angle to the axial direction and each formed at an inner section of the expanding segments. Axial movement of the actuating element causes the first and the second bevels to cooperate, resulting in the expanding segments being extended to thus expand the expanding mandrel. This expander means enables all ring-shaped sections of the workpiece to be fracture-split simultaneously.

Devices of the aforementioned kind have, however, the disadvantage that their expander means is tailored to a specific workpiece geometry, i.e. in this case the position of the ring-shaped workpiece sections to be split and cannot be subsequently changed or adapted to another workpiece geometry, or only so at substantial production expense. Accordingly, a workpiece differing in configuration requires use of another expander means which substantial adds to the costs in having to produce these additional expander means as well as for their storage and maintenance.

SUMMARY OF THE INVENTION

The invention is based on the technical objective of providing a generic device which can be adapted to workpieces comprising ring-shaped workpiece sections to be split at differing positions by ways and means as simple and effective as possible.

The aforementioned technical objective is achieved by a device in accordance with the invention having the features as set forth in claim 1.

This device for fracture-splitting a workpiece comprising several ring-shaped workpiece sections axially aligned in sequence is provided with at least one expander means axially insertable into a bore formed by each of the ring-shaped workpiece sections and comprising at least one expander element expandable at at least two expansion portions spaced away from each other, the expander means being provided with an expansion control means integrated in and cooperating with the at least one expander element for controlling the variation in the position and/or extent and/or timing and/or sequence of expansion of the at least two expansion portions.

A workpiece comprising several ring-shaped workpiece sections axially aligned in sequence in the sense of the invention is understood to be a workpiece arrangement comprising a train of individual workpieces, each having but a sole ring-shaped workpiece section. It may also be a combination of the latter workpiece arrangement and one or more workpieces having several ring-shaped workpiece sections axially aligned in sequence. The integrated expansion control means is preferably configured purely mechanical substantially. However, the invention is not exclusively defined to this kind of configuration. The integrated expansion control means may also contain hydraulic, pneumatic, electromechanical, electrical, electronic or other suitable components as well as mixed forms thereof, all without departing from the scope of the invention.

Due to the expansion control means integrated in the device in accordance with the invention the expander means can now be adapted by simple and effective ways and means to workpieces having a differing number and/or differing position and/or differing configuration of the ring-shaped workpiece sections to be split. Unlike known prior art there is now no need with the device in accordance with the invention to produce a separate expander means for each of a large number of workpiece variants; this also eliminating the need for corresponding storage and/or maintenance thereof. Due to the integrated expansion control means the steps involved in adapting the device in accordance with the invention to each workpiece configured differing can be easily implemented by simple means, thus enabling the production and operating costs of a device in accordance with the invention to be reduced as compared to that of a conventional device. Apart from this, the device in accordance with the invention permits achieving greater flexibility in production which is especially of advantage in smaller series production. It is, however, further to be emphasized that by means of the integrated expansion control means of the expander means not only the position of the expansion portions of the expander means but also their extent and/or timing and/or sequence in expansion can all be variably controlled, resulting in the expander means now being multifunctional in performance whilst additionally enhancing the possibilities of varying production of the workpieces.

Further advantage aspects of the device in accordance with the invention are set forth in the subject matter of the sub-claims.

Preferred example embodiments of the invention including additional aspects and further advantages thereof will now be detailed with reference to the attached drawings.

BRIEF DESCRIPTION OF THE DRAWINGS

FIG. 6 is a greatly simplified outline drawing of a substantial partial portion of an expander means of a device in accordance with the invention in a fourth embodiment.

DETAIL DESCRIPTION OF EXAMPLE EMBODIMENTS OF THE INVENTION

Figure 1:
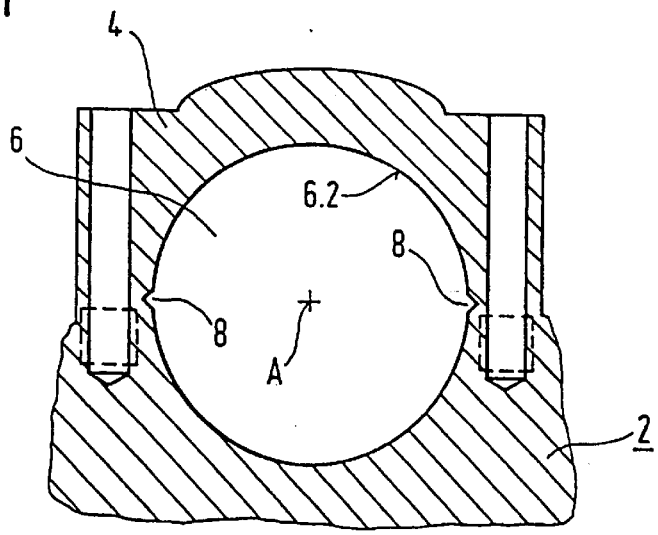
FIG. 1 is a diagrammatic cross-sectional view of an ring-shaped workpiece section of a workpiece to be split by fracture-splitting by means of the device in accordance with the invention.

In the following description and Figures like parts and components are identified by like reference numerals to avoid tedious repetition, as long as no further differentiation is needed.

Referring now to FIG. 1 there is illustrated in a diagrammatic cross-sectional view a single workpiece section 4 of a workpiece 2 configured integrally of several ring-shaped workpiece sections 4 axially aligned in sequence. For the example embodiments as described in the following it is assumed that the workpiece is a housing block 2 comprising several ring-shaped workpiece sections axially aligned in sequence termed bearing caps 4 in the following. In this arrangement the bearing caps 4 may be spaced away from each other in the axial direction either regularly or irregularly. Each bearing cap 4 defines a bore 6 serving to mount a crankshaft or the like. These bearing caps 4 are to be released from the housing block 2 by fracture-splitting so that a macrostructured interlock materializes at the material face of the parted bearing caps 4 and the remaining housing block 2 at a predefined fracture plane, resulting in precise pairing of each bearing cap 4 and its corresponding housing block section. The fracture plane is defined in this case by two fracture notches 8 located on an inner surface area 6.2 of each bore 6 and produced prior to the actual fracture-splitting.

Figure 2:
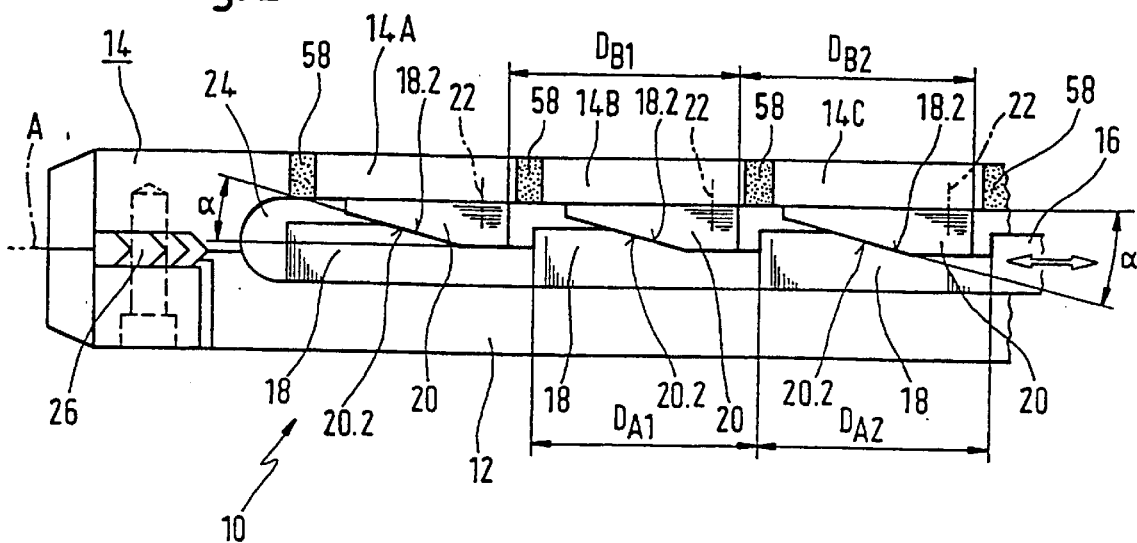
FIG. 2 is a diagrammatic cross-sectional view through an expander means of a device in accordance with the invention in a first embodiment.

Referring now to FIG. 2 there is illustrated in a diagrammatic cross-sectional view how the device in accordance with the invention for fracture-splitting this workpiece 2 includes an expander means comprising a expanding mandrel 10 with two mandrel halves 12, 14 movable relative to each other perpendicular to the axial direction A thus relative to the bores 6 in a radial direction. In this arrangement the expanding mandrel half 12 as shown in FIG. 2 is a fixed mandrel half whilst the movable expanding mandrel half 14 as shown in FIG. 2 is a movable mandrel half. The expanding mandrel 10 is axially insertable (A) into the bores 6 (cf FIG. 1) and expandable in the region of each bearing cap 4 with the aid of of an actuating element (not shown to make for an uncluttered illustration). Each of the portions and/or surroundings of the inserted expanding mandrel 10 located within the bores 6 are termed expansion portions. Depending on the type of expander means used, a single expansion portion may extend axially beyond each bore 6, however, in principle.

The expanding mandrel 10 comprises furthermore an integrated expansion control means disposed between the expanding mandrel halves 12, 14 and cooperating with the movable expanding mandrel half 14 for controlling the variation in the position and/or extent and/or timing and/or sequence of expansion of the expansion portions of the expanding mandrel 10.

This expansion control means comprises an elongated actuating element 16 extending in the axial direction A between the expanding mandrel halves 12, 14, termed pull rod 16 in the following, the end of which protruding from the expanding mandrel 10 can be coupled to the aforementioned actuating element and with the aid of which it is movable axially, as indicated by the double arrow in the drawing. The pull rod 16 has on its longitudinal side facing the movable expanding mandrel half 14 a plurality of integral first wedge elements 18 having first bevels 18.2 extending at an angle ($\alpha$) to the axial direction A. In addition, the expansion control means includes a plurality of second wedge elements 20 releasably secured to the inner side of the movable expanding mandrel half 14 having second bevels 20.2 extending at an angle ($\alpha$) to the axial direction A. The second wedge elements 20 are configured complementary to the first wedge elements 18 and assigned thereto. Although the geometry and more particularly the bevel angle $\alpha$ of the first and second wedge elements 18, 20 in the present example embodiment are the same, they may also differ, as explained in the following.

The mutual axial spacing $DB_1$, $DB_2$, ... $DB_X$ of the second wedge elements 20 is variable adjustable. For this purpose the second wedge elements 20 with fasteners 22 in a guide groove 24 are releasable at the inner side of the movable expanding mandrel halves 14 and thus each located replaceable. The fasteners 22 are designed so that the axial force produced by the pull rod 16 and needed for the expansion which splits at a pair of wedge elements 18, 20 into a component of the expansion force running perpendicular to the axial direction A can be reliably communicated. For this purpose the second wedge elements 20 and/or the movable expanding mandrel halves 14 may be equipped with additional load-transfer elements or counterbearings (not shown in the drawing to make for an uncluttered illustration).

Instead of, or in addition to, the second wedge elements 20 of the movable expanding mandrel halves 14 it is, of course, just as possible to configure the first wedge elements 18 and/or the pull rod 16 such that the mutual axial spacing $DA_1$, $DA_2$ ... $DA_X$ of the first wedge elements 18 on the pull rod 16 is variably adjustable analogously or in some other way.

The functioning and effect of the expansion control means and its differing variants will now be explained in the following by way of a few examples. It is assumed for simplicity that the first and second wedge elements 18, 20 are each configured the same.

EXAMPLE 1

Given is a housing block 2 having identical bearing caps 4 each equally spaced from the other axially. The second wedge elements 20 are located so that their mutual axial spacing $DB_1$, $DB_2$, ... $DB_X$ in each case is the same and corresponds to the mutual axial spacing $DA_1$, $DA_2$ ... $DA_X$ of the first wedge elements 18 of the pull rod 16. Actuation the pull rod 16 simultaneously expands all expansion portions of the expanding mandrel 10 and all bearing caps 4 are simultaneously fracture-splitted.

EXAMPLE 2

Given is a housing block 2 having identical bearing caps 4 each equally spaced from the other axially. The arrangement of the first wedge elements 18 is the same as in example 1. The second wedge elements 20 are located so that the mutual axial spacing between the adjustable second wedge elements 20 in sequence becomes larger: $DB_X > \ldots DB_2 > DB_1$. Actuation of the pull rod 16 expands the expansion portions beginning with the left-hand side in FIG. 2 in sequence and fracture-splitting the bearing caps 4 in sequence, whereas when $DB_1 > DB_2 \ldots > DB_X$ expansion and fracture-splitting would begin from the right-hand side in FIG. 2. These variants are particularly of advantage when a large number of bearing caps 4 needs to be split and/or the fracture-splitting force needs to be maintained low.

Since in this example the wedge elements 18, 20 engage in sequence they may produce a certain inclination or slanting of the movable expanding mandrel half 14 in each activated expansion portion (possibly also at the adjustable expansion portions), especially when the expansion portions are closely located in the axial direction A, since the expansion stroke commences one-sidedly under circumstances. This would result in bending moments in the expanding mandrel which could have a disadvantageous effect. This is why, as indicated in FIG. 2, the movable expanding mandrel half 14 is divided into expanding mandrel half sections 14A, 14B, 14C movably interconnected, each expanding mandrel half section 14A, 14B, 14C being assigned an associated expansion portion. The expanding mandrel half expanding mandrel half sections 14A, 14B, 14C are interconnected via a flexible connection 58 and/or a coupling connection and/or a single and/or multiple articulated connection or the like so that each expansion portion can be expanded independently of the other in effectively avoiding any inclination or slanting of the movable expanding mandrel half 14 as well as any undesirable bending moment resulting therefrom. It is conceivable in the sense of the invention to also equip the fixed expanding mandrel half 12 with corresponding expanding mandrel half-sections in taking into account certain changes in design. It is to be noted that the aspect as explained above may also find application basically in the variants as set forth in the following examples 3 and 4.

EXAMPLE 3

Given is a housing block 2 having identical bearing caps 4 differingly spaced away from each other axially. The first wedge elements 18 on the pull rod 16 and the second wedge elements 20 of the movable expanding mandrel half 14 are positionally axially staggered and then located relative to each other so that they correspond to each other similarly as in example 1, whereby DA1=DB1, DA2=DB2 . . . DAX=DBX. Actuating the pull rod 16 permits attaining in turn simultaneously expansion and fracture-splitting of the bearing caps 4, whereas increasing the mutual axial spacing between adjoining first wedge elements 18 and/or second wedge elements 20 in sequence permits achieving expansion and fracture-splitting in sequence the same as in example 2.

EXAMPLE 4

Given is a housing block 2 having identical bearing caps 4 each equally spaced from the other. It is assumed that the spacings DA1, DA2 . . . DAX are fixedly defined the same as in example 1 whereas the spacings between the second wedge elements is set differingly: DB1≠ . . . DB2≠DBX. Actuating the pull rod 16 produces a sequence in expansion and fracture-splitting of each of the bearing caps 4 differing but precisely defined by the selection of the spacings DB1, DB2 . . . DBX.

It will be appreciated that the examples 1 to 4 as explained above may be modified and/or combined in many different ways. When first and second wedge element pairs 18, 20 are used, each assigned to the other for one or more expansion portions and which differ by their geometry, more particularly by their bevel angle α from the geometry of the other pairs of bevel angles of the expander means, then, for example, each extent and force of expansion of one or more expansion portions can also be set individually. This is particularly of advantage for workpieces having ring-shaped workpiece sections shaped or dimensioned differingly.

Due to it having an integrated expansion control means the expander means as described before thus permits controlling by multifunctional ways and means the variation in the position and/or extent and/or timing and/or sequence and/or force of expansion of the expansion portions both simply and reliably.

Figure 3:
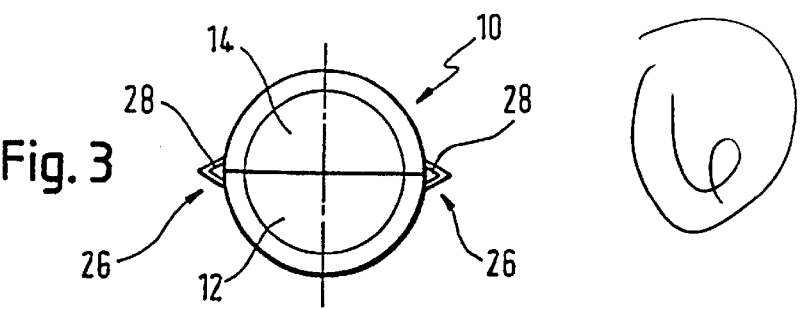
FIG. 3 is a diagrammatic front view of the expander means as shown in FIG. 2.

Referring now to FIG. 3 there is illustrated a diagrammatic front view of the expander means as shown in FIG. 2. As evident from FIGS. 2 and 3 at a section at the front relative to the axial insertion direction A the expanding mandrel 10 features a parting means configured as a broach 26 for producing two fracture notches 8, 8 in each bore 6 (cf. FIG. 1) during insertion of the expander means 10. This parting or broaching means 26 is not to be confused with the means provided for the actual fracture-splitting of the housing block 2; it having in the present case exclusively a machining, shaping function for machining the inner surface areas 6.2 of the bores 6. As is particularly well evident in FIG. 3 the broaching means 26 comprises two diametrically opposed broaches 28 whose cutting edges slightly protrude radially beyond the outer circumference of the expanding mandrel 10. On insertion of the expanding mandrel 10 into the bores 6 of the housing block 2 two diametrically opposed fracture notches 8,8 are broached in the inner surface areas 6.2 of each bore 6 (cf. FIG. 1). In progressing further through the bores 6 axially on insertion the expanding mandrel 10 produces the fracture notches 8 in one bore 6 after the other until all bores 6 of the housing block 2 have been provided with two fracture notches 8, 8 each. In the fully inserted condition the end of the expanding mandrel 10 provided with the broaches 28 protrudes from the last broached bore 6 so that the broaches 28 do not obstruct the expanding mandrel 10 in the subsequent fracture-splitting procedure. After fracture-splitting, the expanding mandrel 10 can be easily removed from the housing block 2, despite the broaches 28, due to the bearing caps 4 being split as well as the workpiece supports normally used in conjunction with the housing block 2 being adjustable, but which are not described in the present.

Figure 4:
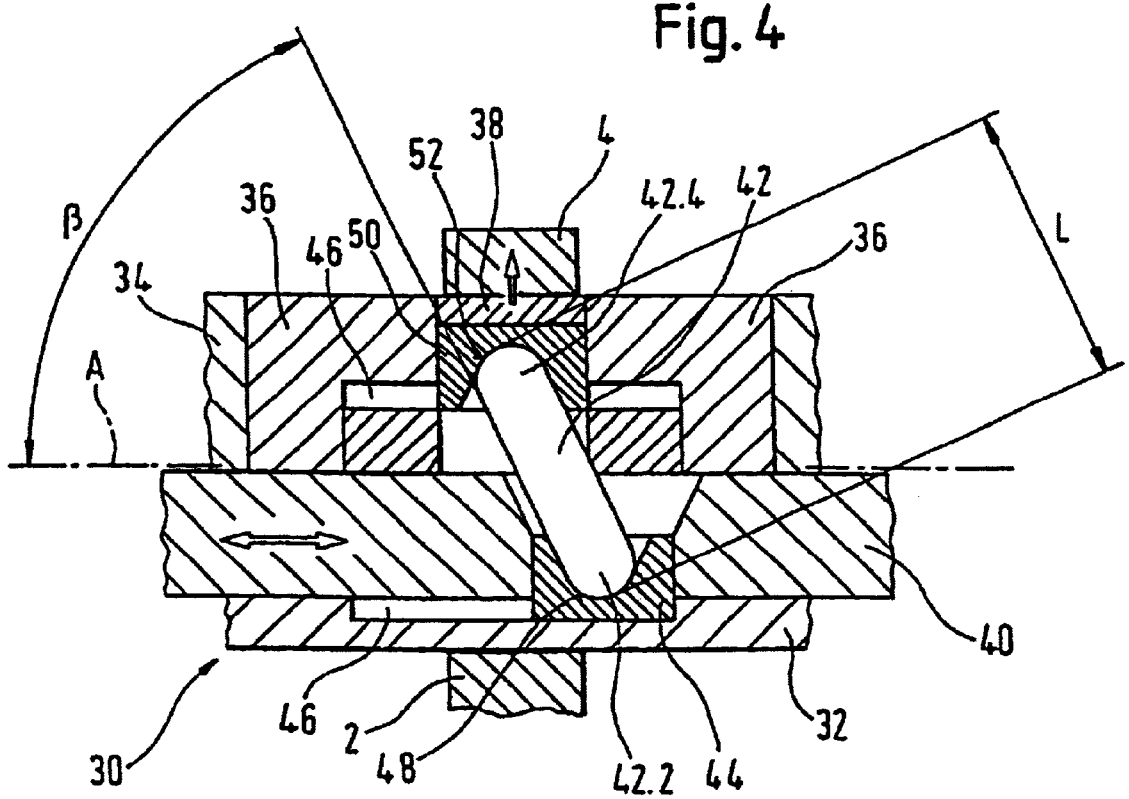
FIG. 4 is a diagrammatic cross-sectional view through a substantial partial portion of an expander means of a device in accordance with the invention in a second embodiment.

Referring now to FIG. 4 there is illustrated a diagrammatic cross-sectional view through a substantial partial portion of an expander means of a device in a second embodiment in accordance with the invention. The expander means comprises an expanding mandrel 30 of which the surroundings of a single expansion portion is illustrated in part in the Figure. The expanding mandrel 30 in turn comprises two expanding mandrel halves 32, 34. The first expanding mandrel half 32 is configured continuous in its longitudinal extent, whilst the second expanding mandrel half 34 comprises in the axial direction A guide pieces 36 spaced away from each other which are located on the first expanding mandrel half 32. Inserted between adjustable guide pieces 36 in each case is a movable fracturing segment 38 having a substantially semi-circular outer circumference, each fracturing segment 38 being assigned as regards its arrangement and function each bearing cap 4 of the housing block 2 to be machined by fracture-splitting. The number of fracturing segments 38 corresponds to the number of bearing caps 4 to be split. The fracturing segments 38 are extensible by means of an elongated fracturing segment actuating element 40 running off-center between the two expanding mandrel halves 32, 34 and movable in the axial direction A relative to the expanding mandrel halves 32 perpendicular to the mounting axis A (and thus relative to the bores 6 in a radial direction). By means of a fracturing segment 38 the expansion effect of the expanding mandrel 30 can thus be achieved at each bearing cap 4 (likewise indicated in the Figure) and a fracturing force exerted.

The expanding mandrel 30 as shown in FIG. 4 features an expansion control means which cooperates with the fracturing segments 38. The expansion control means comprises a plurality of lever elements 42 spaced away from each other in the axial direction A, simply termed levers 42 in the following, each of which is arranged in an expansion portion defined by each fracturing segment 38 between the two expanding mandrel halves 32, 34 and extends at an obtuse angle β transversely to the axial direction A. Thus, each expansion portion in this case is assigned a lever 42. Since the components of the expansion control means in the present case are the same for each expansion portion, only a single expansion portion is considered in the following. A further partial element of the expansion control means forms the aforementioned fracturing segment actuating element 40 oriented in the axial direction A between the two expanding mandrel halves 32, 34, simply termed actuating element 40 in the following. In this case this is indirectly connected to an end portion of each lever 42, i.e. with the lower end 42.2 of lever 42 as shown in FIG. 4, with which it cooperates. This indirect connection is made via a slipper 44 connected to the actuating element 40, the slipper 44 being fixed to the actuating element 40 and movably guided together therewith in a cavity 46 extending axially beyond the expansion portion. The slipper 44 comprises a lever end mount 48 in which the lower lever end 42.2 is articulatedly mounted.

The expansion control means comprises further a lever counterbearing 50 arranged in each expansion portion, i.e. in this case in the region of each fracturing segment 38, and directly cooperating with the latter. The lever counterbearing is configured as a so-called thrust pad 50 which on its side facing the cavity 46 is provided with a lever end mount 52 similar to the lever end mount 48 of the slipper 44. Articulatedly accommodated in the lever end mount 52 of the thrust pad 50 is the other end 42.4 of the lever 42 (the upper end as shown in FIG. 4). In the axial direction A the thrust pad 50 is secured in place between two adjoining guide pieces 36 which also accommodate between them a fracturing segment 38 in each case. In a direction oriented substantially perpendicular to the axial direction A the thrust pad 50 is, however, movable corresponding to the fracturing segment 38. In this arrangement, the side of the thrust pad 50 facing away from the cavity 46 is supported by the inner side of the fracturing segment 38 facing the cavity 46.

In an axial movement of the actuating element 40 in a direction oriented to the left as shown in FIG. 4, the lower lever end 42.2 is slaved in the movement by the actuating element 40 via the slipper 44 and due to the obtuse angled arrangement β of the lever 42 relative to the axial direction A, and because of the support provided by the upper lever end 42.4 in the thrust pad 50 a strong translation with a fracturing force component oriented perpendicular to the axial directon A is achieved which urges the fracturing segment 38 via the thrust pad 50 outwardly in thus achieving an expansion effect. This procedure occurs at the other levers 42 and fracturing segments 38 of the expanding mandrel 30 analogously.

The arrangement of each lever 42 of the expansion control means, more particularly however the magnitude of the obtuse angle β, is either fixedly predefined or adjustable individually. Making this adjustable in the sense of the invention is assured by various features of the device, most of which are evident from FIG. 4. Thus, the angle setting β of the lever 42 can be influenced by the stagger of the lever end mounts 48, 52 as measured, for example, in the axial direction A, the axial and/or vertical dimension or arrangement of the slipper 44 and/or of the thrust pad 50 and/or of the axial and/or vertical position and/or configuration of the slider/actuating element connection or in general by the axial and/or vertical position of the joints or engagement points of the levers. Even the length L of the lever 42, assuming a sufficient axial movement of the actuating element 40 or slipper 44 with the other fixedly predefined dimensions of the device, will influence the angle setting β. Thus, a longer lever 42 in a non-expanded starting condition of the expanding mandrel 30 will have a smaller angle β and a shorter lever 42 a larger angle β. Depending on the arrangement and configuration of the lever 42, slipper 44, thrust pad 50 or actuating element 40 or any additional components disposed inbetween, the expansion response of the expanding mandrel 30 can thus be specifically controlled.

This will now be made clear by way of the following examples. It is assumed in this case that the actuating element 40, slipper 44, thrust pad 50, fracturing segments 38 and guide pieces 36 are arranged and configured the same in machining a housing block 2 having a number and arrangement of identical bearing caps 4 corresponding to the fracturing segments 38 of the expanding mandrel 30.

EXAMPLE 5

The length L of the levers 42 is the same for all expansion portions and thus the obtuse angle β is the same for all levers 42. Accordingly, activation of the actuating element 40 results in all fracturing segments 38 being extended simultaneously and identically as regards their extent or stroke of expansion, each exerting substantially the same expansion force on the bearing caps 4 and causing simultaneous fracture-splitting of all bearing caps 4.

EXAMPLE 6

Here the length L of the levers 42 differs and, starting from the free end of the expanding mandrel 30 and relative to each adjustable expansion portion, becomes uniformly longer, as a result of which each obtuse angle β of the levers 42, starting from the free end, becoming all the more smaller. Thus activation of the actuating element 40 results in the fracturing segments 38, starting from the free end, being extended in sequence to fracture-split the bearing caps 4 in sequence. In this arrangement, the first fracture occurs at the lever having the largest obtuse angle β in the starting position, since this is the first to apply the necessary fracturing force (in assuming a sufficient expansion stroke being achieved).

EXAMPLE 7

The length L of the levers 42 and their angular arrangement and angular distribution over the entire expanding mandrel 30 differ for each fracturing segment 38. Activation of the actuating element 40 results in the fracturing segments 38, starting with the shortest lever (having the largest obtuse angle β; assuming a sufficient expansion stroke being achieved) being extended differingly in sequence but as precisely defined by the angle β in each case, and thus fracture-splitting of the bearing caps 4 likewise differing in sequence but as precisely defined.

It will be appreciated that the examples 5 to 7 as described above can be modified and/or combined in may different ways. It is to be noted that the results as described in the examples 6 and 7 can, of course, also be achieved with levers 42 the same in length L, the obtuse angle β of the levers 42 in each case being substantial to controlling the expansion response, however. For the same lever length L in each case a differing obtuse angle β could be achieved, for example, by slippers 44 differing in axial length and/or vertical dimensions or by engagement points of the slippers 44 differently spaced away from each other at the actuating element 40 and the like.

Figure 5:
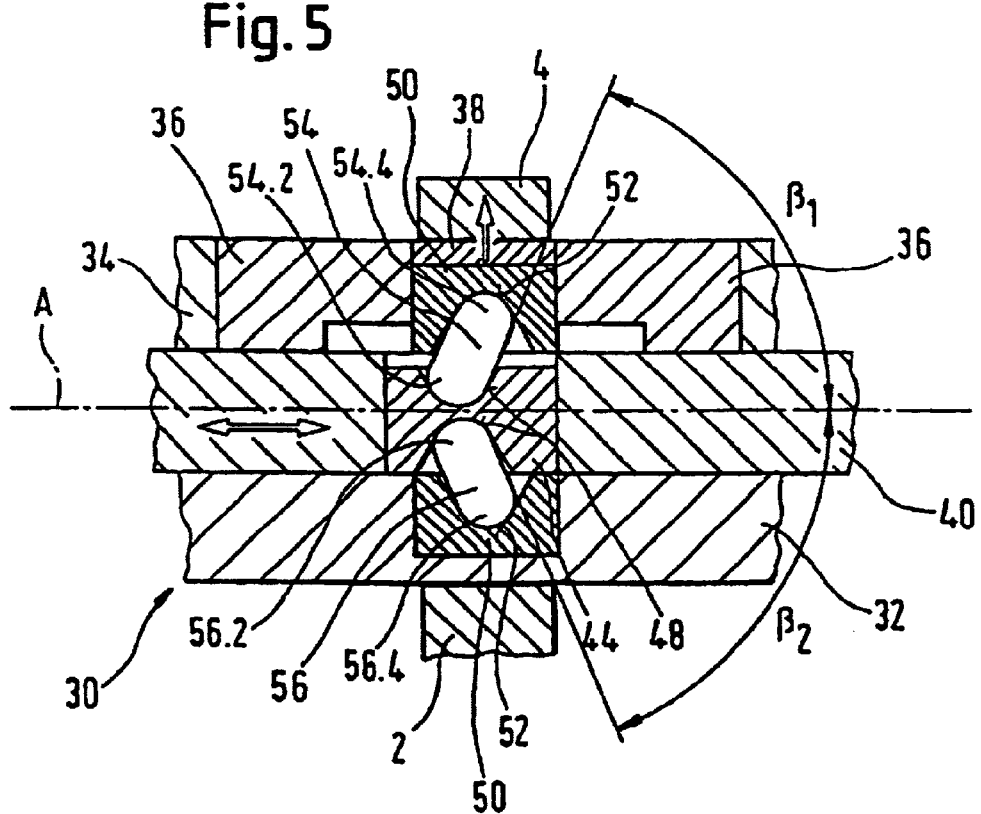
FIG. 5 is a diagrammatic cross-sectional view through a substantial partial portion of an expander means of a device in accordance with the invention in a third embodiment.

Referring now to FIG. 5 there is illustrated a diagrammatic cross-sectional view through an expander means in a third embodiment of a device in accordance with the invention. The expansion control means of this variant has basically the same design as shown in FIG. 4, except that the actuating element 40 runs substantially through the middle of the expanding mandrel 30. In addition, each expansion portion, i.e. in this case each fracturing segment 38, is assigned two levers 54, 56 arranged mirror-inversely to each other relative to the centerline of the expanding mandrel 30 running in the axial direction A and forming a pair of levers, between which the actuating element 40 runs. The obtuse angles β1, β2 of the levers 54, 56 equal each other in the present example, although, of course, applications are also conceivable in which the obtuse angles β1, β2 differ from each other.

The ends 54.2, 56.2 of the lever pair 54 and 56 respectively facing the actuating element 40 are indirectly connected to the actuating element 40 via a slipper 44 fixed to the actuating element 40 and having two side lever end mounts 48, 48 opposite each other in being slaved in the movement axially with the actuating element 40 in cooperate therewith. The other ends 54.4, 56.4 of the two levers 54 and 56 respectively are each supported in a thrust pad 50, 50 assigned to each expanding mandrel half 32, 34, the lower thrust pad 50 as shown in FIG. 5, the same as in the embodiment as shown in FIG. 4, cooperating in turn with the fracturing segment 38.

With the expansion control means as shown in FIG. 5 the effects and means off control as already described in conjunction with FIG. 4 are likewise achievable. However, unlike the variant as shown in FIG. 4, the example embodiment as shown in FIG. 5 achieves even smaller axial dimensions as well as a larger number of possible variants due to the lever pair arrangement with its angles β1, β2.

Referring now to FIG. 6 there is illustrated a greatly simplified outline drawing of a substantial partial portion of an expander means of a device in accordance with the invention in a fourth embodiment. This variant is basically designed similar to the embodiment as shown in FIG. 4 and illustrates a case in which the dimensions of the device components employed, i.e. in this case the lengths of levers (lever 1, lever 2 and lever 3) as well as e.g. the arrangement and dimension of the thrust pads and thus also the position of the lever jointing points relative to a starting position, all differ for each expansion portion. In the non-actuated starting position the upper end points of all three levers are level, as indicated by the line "0" in FIG. 6. This example is a good illustration of how the length of the lever must not automatically influence the angle β for a specifically design, lever 3 being shorter than lever 2 but having the same angle β (in this case 45°). As indicated in the drawing it is basically possible to achieve in the variant as shown in FIG. 4 variable expansion strokes, however, with the stroke Ha of the fracturing segment actuating element being the same for all levers. As a rule, however, it is desired that the expansion stroke is the same in magnitude at each location or at each fracturing segment, since this permits a simpler design of the device. Achieving a desired start of expansion and fracture in time or differing the force built up for the same stroke Ha is possible by suitably defining the lever length and the corresponding angle β. The upper ends of the levers or the corresponding upper lever jointing points, e.g. in a starting position, may be located level (in this case line "0") whilst each of the lower lever ends or the corresponding lever jointing points may be located differently positioned (cf. levers 2 and 3). A corresponding configuration could be made use of analogously to the example 7 as shown above.

It is understood that the invention is not restricted to the example embodiments as shown above, which merely serve to explain the gist of the invention in general. Instead, the device in accordance with the invention may also assume embodiments other than those as shown above without departing from the scope of protection intended. In this respect the device may comprise, more particularly, features representing a combination of the individual features as claimed as well as of the details as described in the example embodiments. The wedge elements 18, 20 of the expansion control means as shown in FIG. 2 may also be combined into larger units, it further being possible to provide the wedge elements 18 on both sides of the elongated actuating element 16 and the wedge elements 20 on both expanding mandrel halves 12, 14. In case fracturing segments are used, bevels may also be arranged on the inner section of the fracturing segments. In the variants as shown in FIGS. 4 and 5 the lever arms 42, 54, 56 may also be directly connected to the actuating element 40 or the fracturing segment 38, e.g. by a joint connection. This only makes sense, however, where low fracturing forces or a very stable dimension of the individual components and joints are involved. Where necessary, several single levers may also be provided for each expansion portion, for example in a parallel lever arrangement, or several lever pairs or more complex lever mechanisms. The geometry and arrangement of the levers may also differ from that as indicated in the above examples. Instead of a single actuating element 16, 40 several such actuating elements are conceivable for actuating the components of the expansion control means or expander elements individually and/or in groups.

Reference numerals in the claims, description and drawings merely serve a better understanding of the invention and are not to be understood as restricting the scope of protection intended.

LIST OF REFERENCE NUMERALS 2 workpiece/housing block
4 ring-shaped workpiece sections/bearing caps
6 bore in 4
6.2 inner surface area of 6
8 fracture notches
10 expanding mandrel
12 expanding mandrel half of 10
14 expanding mandrel half (movable) of 10
14A expanding mandrel half section
14B expanding mandrel half section
14C expanding mandrel half section
16 actuating element/pull rod
18 first wedge elements
18.2 first bevels
20 second wedge elements
20.2 second bevels
22 fasteners
24 guide groove in 14
26 parting/broaching means 26
28 broaches of 26
30 expanding mandrel
32 first expanding mandrel half of 30
34 second expanding mandrel half of 30
36 guide pieces
38 fracturing segments of 30
40 fracturing segment actuating element of 30
42 lever elements/levers
42.2 upper end of 42
42.4 lower end of 42
44 slipper 46 cavity
48 lever end mount of 44
50 lever counterbearing/thrust pad 50
52 lever end mount of 50
54 lever
56 lever
58 flexible/movable connection
.α bevel angle
.β1 obtuse angle
.β2 obtuse angle
A axial direction
h expansion stroke of a lever or fracturing segment
Ha stroke of 40 in axial direction

What is claimed is:

1. A device for fracture-splitting a workpiece with several ring-shaped workpiece sections axially aligned in sequence, the device including at least one expander means which is axially insertable into a bore formed by each of said ring-shaped workpiece sections and comprising at least one expander element which can be expanded at a minimum of two expansion portions spaced away from each other in said axial direction characterized in that said expander means is provided with an expansion control means which is integrated in and cooperates with at least one said expander element, and said integrated expansion control means is selected from a group of integrated expansion control means comprising:

an integrated expansion control means for controlling the variation in the position of at least two expansion portions, an integrated expansion control means for controlling the variation in the expansion extent of at least two expansion portions, an integrated expansion control means for controlling the variation in the expansion timing of at least two expansion portions, an integrated expansion control means for controlling the variation in the expansion sequence of at least two expansion portions, and an integrated expansion control means which comprises a combination of two or more of the aforementioned integrated expansion control means, said expander means comprising at least one expanding mandrel having two expanding mandrel halves, of which at least one includes expansion portions spaced away from each other in said axial direction and said expansion control means being arranged between said expanding mandrel halves, said expansion control means comprising:

a plurality of lever elements spaced away from each other in said axial direction, each of which is arranged in an expansion portion between said two expanding mandrel halves, extending in an obtuse angle transversely to said axial direction and each cooperating with said at least one expander element, at least one actuating element oriented in said axial direction between said two expanding mandrel halves and which is connected to a first end portion of each of said lever elements and cooperates therewith, and at least one lever element counterbearing arranged in each expansion portion and actively connected thereto and which is connected to a second end portion of each of said lever elements and supports said second end portion.

2. The device as set forth in claim 1, characterized in that said second end portion of each of said lever elements is mounted in a thrust pad movably substantially perpendicular to said axial direction and cooperating with said expander element.

3. The device as set forth in claim 1, characterized in that each expansion portion is assigned at least one of said lever elements.

4. The device as set forth in claim 1, characterized in that the angular position of each of said lever elements is individually adjustable.

5. The device as set forth in claim 1, characterized in that the length of each of said lever elements is the same.

6. The device as set forth in claim 1, characterized in that the length of each of said lever elements is different.

7. The device as set forth in claim 1, characterized in that said expander means is equipped at a front section relative to said axial insertion direction with at least one parting means for producing one or more fracture notches in said bore.

* * * * *